(12) United States Patent
Dong et al.

(10) Patent No.: US 9,448,831 B2
(45) Date of Patent: Sep. 20, 2016

(54) EFFICIENT GRAPHICS VIRTUALIZATION WITH ADDRESS BALLOONING

(71) Applicant: INTEL CORPORATION, Santa Clara, CA (US)

(72) Inventors: Yaozu Dong, Shanghai (CA); Kun Tian, Shanghai (CN); Ke Yu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 14/125,148

(22) PCT Filed: Jul. 1, 2013

(86) PCT No.: PCT/CN2013/078577
§ 371 (c)(1),
(2) Date: Dec. 10, 2013

(87) PCT Pub. No.: WO2015/000106
PCT Pub. Date: Jan. 8, 2015

(65) Prior Publication Data
US 2015/0193247 A1    Jul. 9, 2015

(51) Int. Cl.
*G06F 9/455* (2006.01)
*G06F 12/08* (2016.01)
*G06F 9/50* (2006.01)
*G06T 1/60* (2006.01)

(52) U.S. Cl.
CPC ........... *G06F 9/45558* (2013.01); *G06F 9/455* (2013.01); *G06F 9/45533* (2013.01); *G06F 9/5077* (2013.01); *G06F 12/08* (2013.01); *G06F 2009/45583* (2013.01); *G06T 1/60* (2013.01)

(58) Field of Classification Search
CPC .......................................... G06F 9/445–9/5094
See application file for complete search history.

(56) References Cited

U.S. PATENT DOCUMENTS

| | | | |
|---|---|---|---|
| 7,702,843 B1 * | 4/2010 | Chen | G06F 9/5016 718/1 |
| 8,095,931 B1 * | 1/2012 | Chen et al. | 718/104 |
| 2006/0010440 A1 * | 1/2006 | Anderson | G06F 9/45533 718/1 |
| 2006/0202999 A1 * | 9/2006 | Thornton | G06F 12/145 711/E12.102 |
| 2009/0037936 A1 | 2/2009 | Serebrin | |

(Continued)

FOREIGN PATENT DOCUMENTS

| | | |
|---|---|---|
| CN | 102779074 A | 11/2012 |
| CN | 103092678 A | 5/2013 |

OTHER PUBLICATIONS

Zhao, Weiming, et al., "Dynamic Memory Balancing for Virtual Machines", 2009, pp. 37-47.*

(Continued)

*Primary Examiner* — Thuy Dao
*Assistant Examiner* — Christopher Franco
(74) *Attorney, Agent, or Firm* — Jordan IP Law, LLC

(57) ABSTRACT

Systems and methods may provide for identifying an assigned address space of a virtual machine (VM), wherein the assigned address space is associated with a graphics memory. Additionally, the assigned address space may be ballooned to disable usage by the VM of a remaining address space in the graphics memory that is not assigned to the VM. In one example, a view of the assigned address space by the VM may be identical to a view of the assigned address space by a virtual machine monitor (VMM) associated with the VM.

15 Claims, 7 Drawing Sheets

(56) References Cited

U.S. PATENT DOCUMENTS

| | | | |
|---|---|---|---|
| 2010/0241785 A1* | 9/2010 | Chen et al. | 711/6 |
| 2011/0320682 A1* | 12/2011 | McDougall et al. | 711/6 |
| 2012/0030406 A1* | 2/2012 | Chang | G06F 9/5016 711/6 |
| 2012/0110293 A1* | 5/2012 | Yang | G06F 9/445 711/170 |
| 2012/0124305 A1* | 5/2012 | Weissman | G06F 12/0223 711/160 |
| 2012/0246320 A1* | 9/2012 | Waldspurger | G06F 9/5016 709/226 |
| 2012/0290765 A1* | 11/2012 | Durrant | G06F 9/5022 711/6 |
| 2013/0290641 A1* | 10/2013 | Corrie | G06F 12/0875 711/133 |
| 2013/0325912 A1* | 12/2013 | Corrie | G06F 9/45558 707/813 |
| 2014/0026137 A1* | 1/2014 | Vembu | G06F 9/4881 718/102 |

OTHER PUBLICATIONS

Salomie, Tudor-Ioan, et al., "Application Level Ballooning for Efficient Server Consolidation", Apr. 2013, pp. 337-350.*

HaoGang, Chen, et al., "DMM: A dynamic memory mapping model for virtual machines", 2010, pp. 1098-1108.*

Min, Changwoo, et al., "VMMB: Virtual Machine Memory Balancing for Unmodified Operating Systems", 2012, pp. 69-84.*

Hines, Michael R., et al., "Post-Copy Based Live Virtual Machine Migration Using Adaptive Pre-Paging and Dynamic Self-Ballooning", 2009, pp. 51-60.*

Hwang, Woomin, et al., "HyperDealer: Reference-pattern-aware Instant Memory Balancing for Consolidated Virtual Machines", 2010, pp. 426-434.*

International Search Report and Written Opinion received for PCT Patent Application No. PCT/CN2013/078577, mailed on Mar. 27, 2014, 10 pages.

* cited by examiner

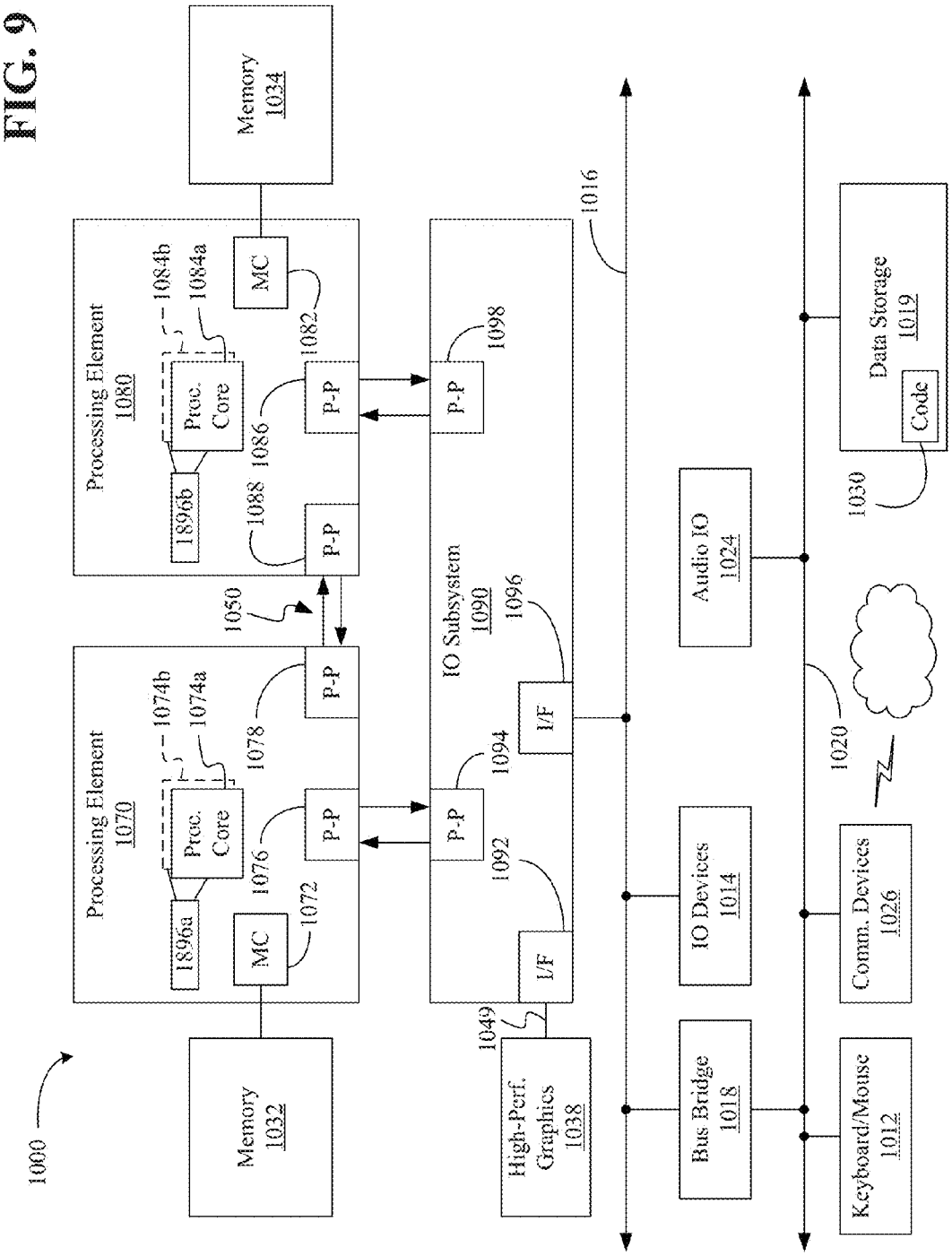

EFFICIENT GRAPHICS VIRTUALIZATION WITH ADDRESS BALLOONING

TECHNICAL FIELD

Embodiments generally relate to graphics virtualization environments. More particularly, embodiments relate to the use of address ballooning to enhance efficiency in graphics virtualization environments.

BACKGROUND

Graphics virtualization may enable software executing within a virtual machine (VM) to control various events and have access to graphics hardware resources on a physical machine, wherein a virtual machine monitor (VMM) may create and run the VMs on the physical machine. Accordingly, the VM software may collectively be referred to as guest software and the VMM may be referred to as a host. Partitioning the graphics hardware resources between multiple VMs may present certain challenges with regard to efficiency and security. For example, the host and the guest software in conventional graphics virtualization solutions may not have the same view (e.g., size and layout) of the graphics memory address space, nor can the guest graphics memory address space be identical to the system memory address space in certain instances. Accordingly, as guest commands (e.g., rendering commands) are issued by the guest software to the graphics hardware, address remapping and/or fixing (e.g., finding the guest address in the command and replacing it with a host address) from the guest view to the host view may be conducted. Hardware based address remapping and/or fixing may involve tagging technology that adds complexity. Moreover, software based address remapping and/or fixing may involve VMM interception, parsing and/or conversion of each guest command, which may have a negative impact on performance.

BRIEF DESCRIPTION OF THE DRAWINGS

The various advantages of the embodiments will become apparent to one skilled in the art by reading the following specification and appended claims, and by referencing the following drawings, in which:

FIG. 9 is a block diagram of an example of a system according to an embodiment.

DESCRIPTION OF EMBODIMENTS

Figure 1A:
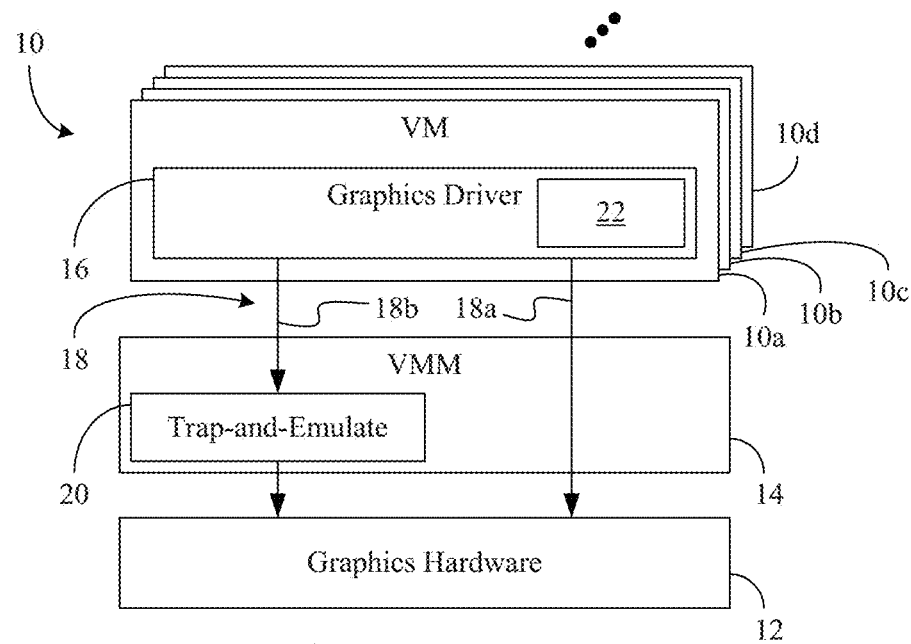
FIGS. 1A and 1B are block diagrams of examples of graphics virtualization environments according to an embodiment.

Turning now to FIG. 1A, a graphics virtualization environment is shown in which a plurality of virtual machines (VMs) 10 (10a-10d) access graphics hardware 12 via a virtual machine monitor (VMM) 14. The graphics hardware 12 may include, for example, registers and/or memory devices that support the performance of graphics related tasks. Each VM 10 may function as a self-contained platform, running its own operating system (OS) and/or application software. In the illustrated example, the VM 10a includes a graphics driver 16 (e.g., guest software) that conducts various operations 18 (18a, 18b) with respect to the graphics hardware 12. Other VMs may also include guest software that is specific to the OS configuration of the respective VM.

The operations 18 may generally relate to the memory mapped input output (MMIO) address operation of graphics related applications such as, for example, gaming applications, video applications, and so forth. In general, graphics memory address space in the graphics hardware 12 may be partitioned between the VMs 10 so that the addresses used by each VM 10 may be directly used by the graphics hardware 12. In one example, the VM 10a includes efficiency logic 22 to identify an assigned address space of the VM 10a for MMIO operations and balloon the remaining address space that is not assigned to the VM 10a (e.g., address space assigned to the other VMs). Thus, "ballooning" may involve the VM 10a cooperatively refraining from using the remaining address space. As will be discussed in greater detail, the VMM 14 may ensure that the VM 10a complies with the policy of refraining from using the remaining address space. Such an approach may enable the view of the assigned address space by the VM 10a (and indeed, the entire graphics memory address space) to be identical to the view of that assigned address space by the VMM 14 (e.g., VMM address space). The other VMs may also include efficiency logic to balloon their non-assigned address space in a similar fashion. As a result, conventional address remapping and/or address fixing solutions may be eliminated, which may in turn significantly enhance efficiency.

More particularly, a first set 18a of the operations 18 (e.g., performance critical operations) may be provided direct access to an aperture region of the graphics hardware 12, whereas a second set 18b of the operations 18 (e.g., non- or less-performance critical operations) may be processed by a trap-and-emulate module 20 of the VMM 14 prior to being given access to the MMIO address space of the graphics hardware 12. The "aperture" region may be part of a graphics processing unit (GPU) graphics memory address space that is mapped to a system memory address space for central processing unit (CPU) accesses. Thus, the entire graphics memory address space (aperture and non-aperture regions) may be accessed by the GPU in the illustrated approach. The operations 18 may involve, for example, frame buffer access and other guest virtual OS activities. As will be discussed in greater detail, the aperture regions may be partitioned among the VMs 10 so that address remapping and/or address fixing is not needed.

Figure 1B:
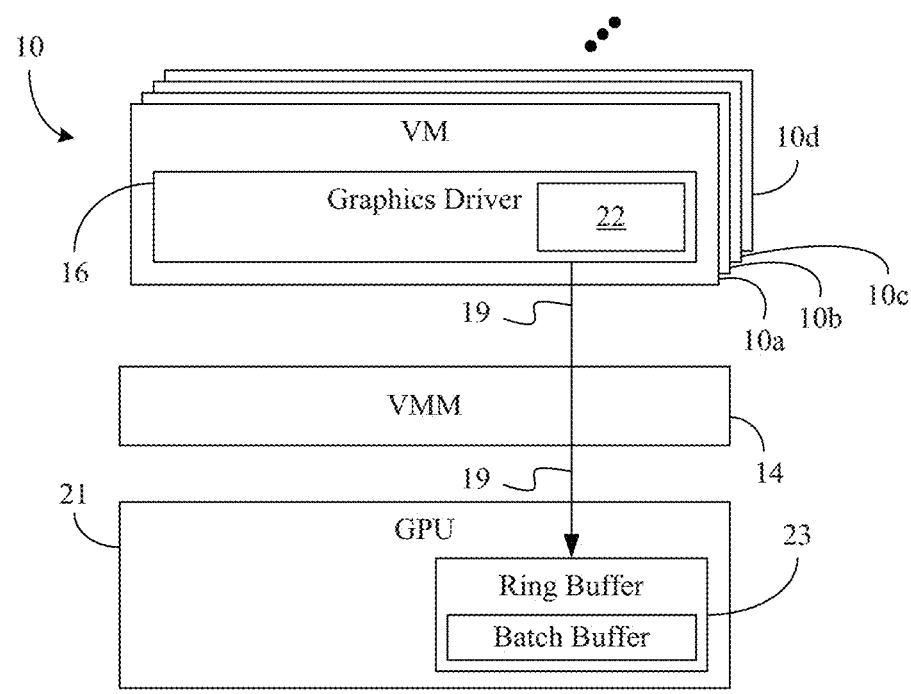

FIG. 1B shows a graphics virtualization environment in which the plurality of VMs 10 generate commands 19 that are passed through directly to a graphics processor such as, for example, a GPU 21. The commands 19 may include rendering commands, media commands, blitter commands, and so forth, that may be placed in a batch buffer and/or ring buffer 23 by a host processor such as, for example, a CPU (not shown) running the VMs 10 and/or the VMM 14. The GPU 21 may fetch the commands 19 from the batch buffer and/or ring buffer 23 for execution. The batch buffer and/or ring buffer 23 may therefore enable the CPU to safely send commands to the GPU 21. In general, the commands 19 may contain graphic memory addresses (GMAs) that may be considered non-aperture regions of the graphics hardware.

As in the case of the aperture regions associated with the MMIO operations 18 (FIG. 1A), the non-aperture regions associated with the commands 19 may be partitioned among the VMs 10 so that address remapping and/or address fixing is not needed. Moreover, the illustrated efficiency logic 22 may identify an assigned address space of the VM 10a for commands and balloon the remaining address space that is not assigned to the VM 10a (e.g., address space assigned to the other VMs). As already noted, the other VMs may also include efficiency logic to balloon their non-assigned address space in a similar fashion.

Figure 2:
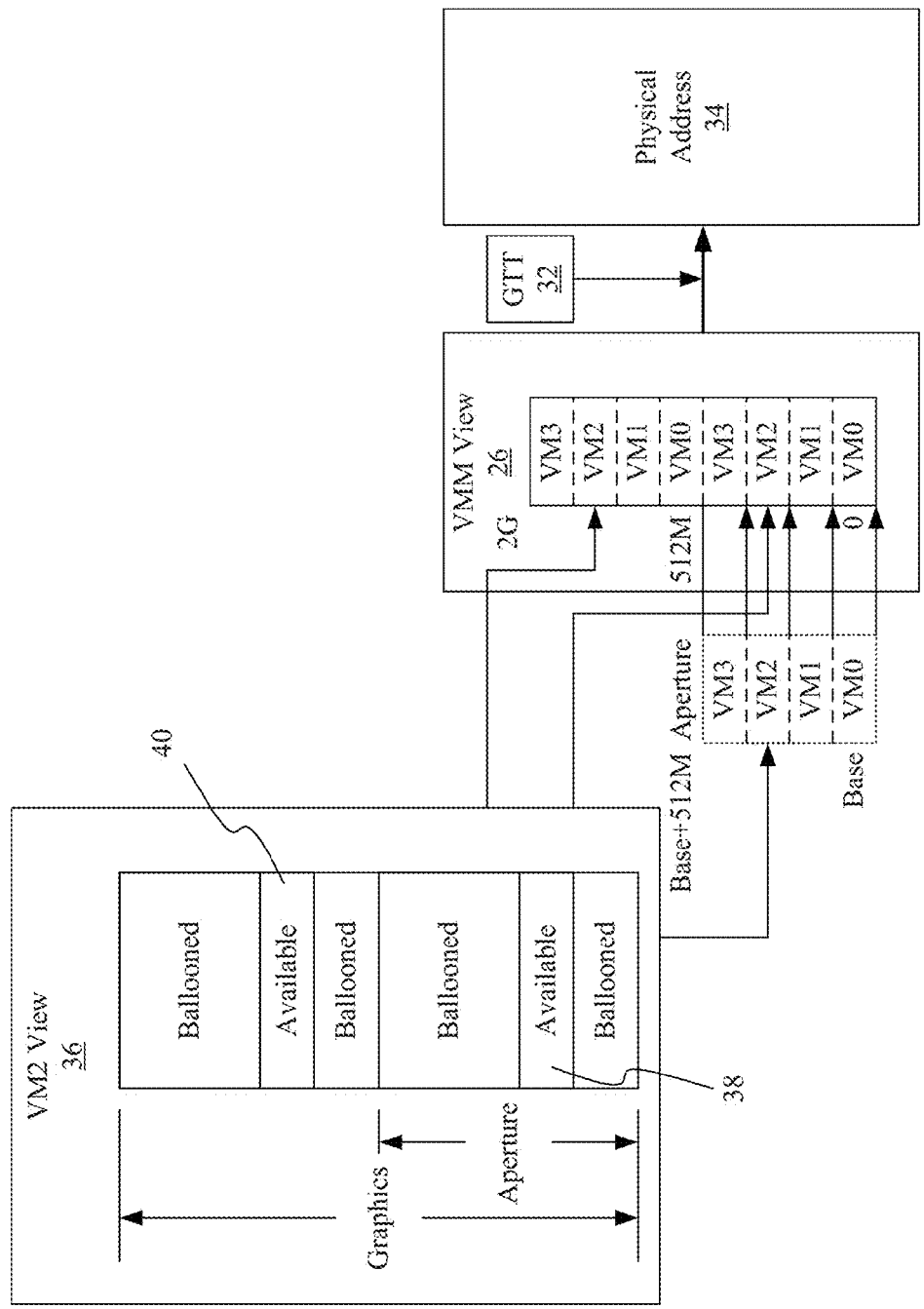
FIG. 2 is a block diagram of an example of an address ballooning approach according to an embodiment.

FIG. 2 shows a partitioning approach in which a VM view 36 of a graphics memory address space assigned to the VM is identical to a VMM view 26 of the graphics memory address space. In the illustrated example, a particular VM ("VM2") may issue commands for direct access to an aperture region of the graphics memory address space and direct access to a non-aperture region of the graphics memory address space. In the illustrated example, a graphics translation table (GTT) 32 maps addresses in the graphics memory address space to addresses in a physical address space 34 (e.g., system address space) on a system bus associated with the graphics hardware/memory. The illustrated partitioning approach may also apply to other VMs in the system (e.g., VM0, VM1, VM3). For example, the address space not assigned to VM2 may be partitioned among and assigned to VM0, VM1, VM3, etc., so that the other VMs may also issue commands for direct access to an aperture region of the graphics hardware and direct access to a non-aperture region of the graphics hardware.

More particularly, an address ballooning approach is shown in which the VM view 36 of the graphics memory address space assigned to the VM includes ballooned address spaces. For example, remaining address space other than an assigned address space 38 in an aperture region may be ballooned so that the VM corresponding to the assigned address space 38 ("VM2") will not use the remaining address space in the aperture region. Similarly, remaining address space other than an assigned address space 40 in the non-aperture region may be ballooned so that the VM in question will not use the remaining address space in the non-aperture region. The VMM view 26 demonstrates that the assigned address spaces 38, 40 may be the same from the perspective of both the VM and the VMM. Although the illustrated example shows a single address space in the aperture and non-aperture regions, each VM may also have multiple segments of address space in each region.

Figure 3:
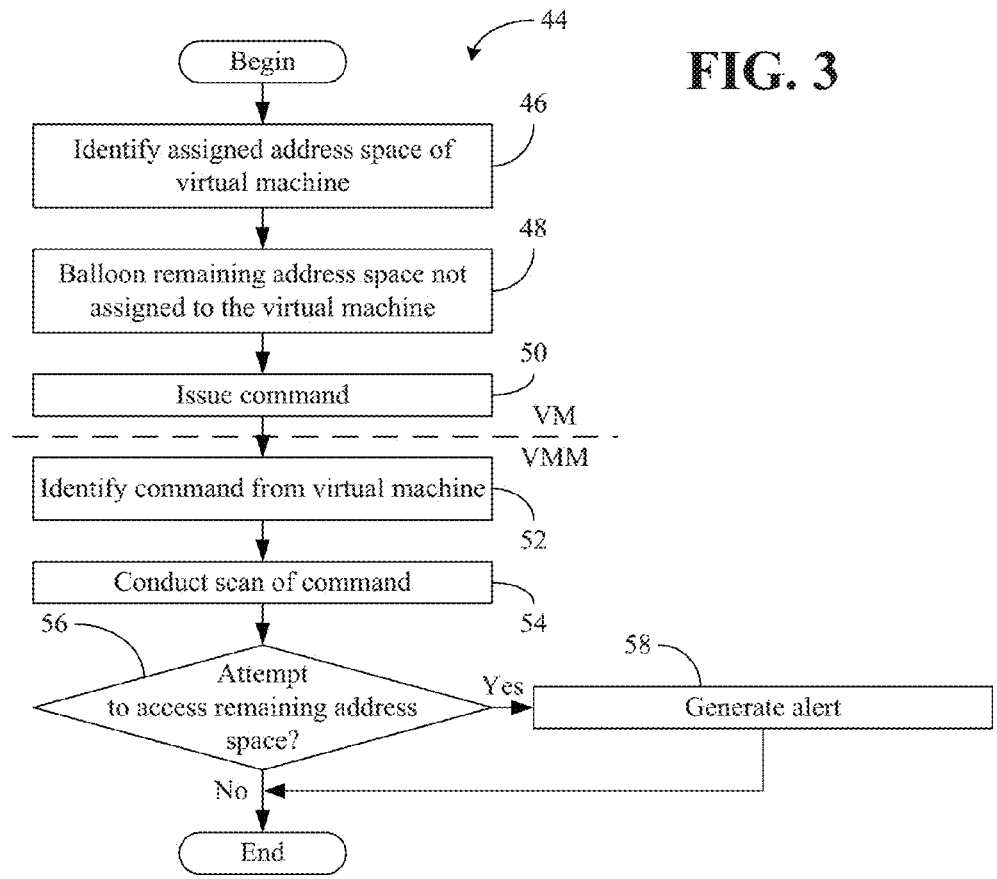
FIG. 3 is a flowchart of an example of a method of managing virtual machines according to an embodiment.

Turning now to FIG. 3, a method 44 of managing virtual machines is shown. The method 44 may be implemented in a computing device as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 44 may be written in any combination of one or more programming languages, including an object oriented programming language such as C++ or the like and conventional procedural programming languages, such as the "C" programming language or similar programming languages. Moreover, the method 44 may be implemented using any of the aforementioned circuit technologies.

Illustrated VM block 46 identifies an assigned address space of a VM, wherein the assigned address space is associated with a graphics memory address space. The VM and a VMM associated with the VM may use a paravirtualized mechanism to convey information indicating the assigned address space and/or the guest software in the VM may query the VMM (e.g., through hypercall) for the assigned address space. VM block 48 balloons the remaining address space that is not assigned to that VM. As already noted, such an approach may enable the view of the assigned and ballooned address space by the VM to be identical to the view of the host (or VMM) address space. VM block 50 may issue a command such as, for example, a frame buffer access, rendering, media and/or blitter command, to the graphics hardware through a batch buffer and/or ring buffer such as, for example the ring buffer 23 (FIG. 1B), as already discussed.

Illustrated VMM block 52 provides for identifying the command from the VM, wherein the command may include a rendering command, media command, blitter command, and so forth. In the illustrated example, a scan of the command may be conducted at VMM block 54, wherein the scan may be conducted via the VMM and/or a hardware boundary checker. A purely VMM-based solution may be considered relatively "lightweight" because no address conversion would be involved.

If it is determined at VMM block 56 that the command attempts to access the remaining address space in the graphics hardware that is not assigned to the VM in question, illustrated VMM block 58 may generate an alert (e.g., host processor, central processing unit/CPU interrupt, etc.). If the VM and/or guest software is trusted, the command scan at VMM block 54 and the determination at VMM block 56 may be bypassed, in order to improve performance.

With regard to CPU memory accesses, an extended page table (EPT) may be used to protect against accesses outside the assigned address space. For GPU memory accesses, however, a GTT and/or per process GTT (PPGTT) may be used to protect against accesses outside the assigned address space.

Figure 4:
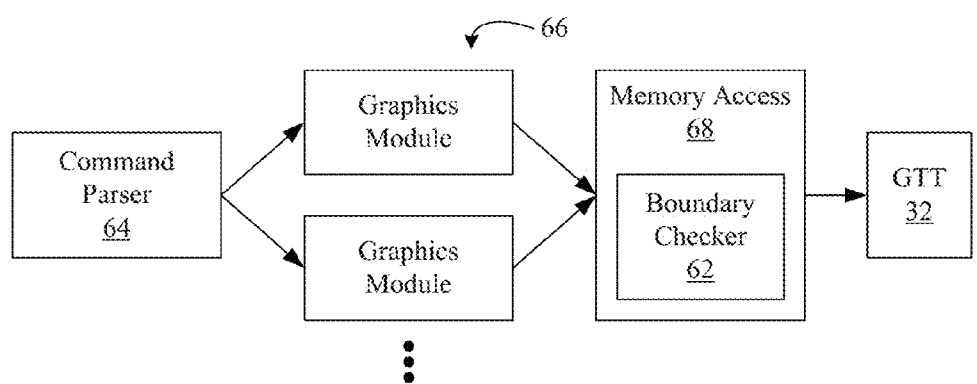
FIG. 4 is a block diagram of an example of an architecture having a hardware boundary checker according to an embodiment.

FIG. 4 shows a graphics processor architecture that uses a hardware boundary checker 62 to scan VM commands. In the illustrated example, a command parser 64 parses commands and distributes them to various graphics modules (e.g., rendering engines) 66, which may in turn issue those commands to a memory access module 68 containing the hardware boundary checker 62. In one implementation, the boundary checker 62 uses lower/upper pair address registers for guest aperture (lower) and non-aperture (upper) regions of the graphics memory address space of the current VM. These address registers may be programmed/restored by the VMM at rendering engine/owner switch time. Thus, the below pseudo code may provide for the alert decision making process.

If ((GMA>=lower_aperture)&& (GMA<upper_aperture)), access OK;
Else if ((GMA>=lower_gmadr)&& (GMA<upper_gmadr)), access OK;
Else access is denied Where "GMA" may refer to the address of a graphics memory access attempt, "lower_aperture" and "upper_aperture" may refer to the lower and upper address boundaries, respectively, in the aperture region of the graphics memory assigned to the VM in question, and "lower_gmadr" and "upper_gmadr" may refer to the lower and upper boundaries, respectively, in the non-aperture region of the graphics memory.

In one example, the hardware boundary checker 62 only checks accesses from the graphics modules 66. In such a case, the check of host processor accesses (e.g., through aperture) may be conducted using an EPT of the VMM, as already noted.

In another implementation, the hardware scan may verify the command against multiple aperture segments and multiple non-aperture segments in the assigned address space. Thus, the boundary checker 62 might use multiple sets of lower/upper pair address registers to support multiple segments of aperture/gmadr regions as follows.

```
{
For (i=0; i<num1; i++)
    If                    ((GMA>=lower_aperture[i])&&
        (GMA<upper_aperture[i]), access OK;
    If (i==num1)
        For (i=0; i<num2; i++)
            If                ((GMA>=lower_gmadr[i])&&
                (GMA<upper_gmadr[i])), access OK;
        If (i==num2)
            access is denied.
}
```

Figure 5:
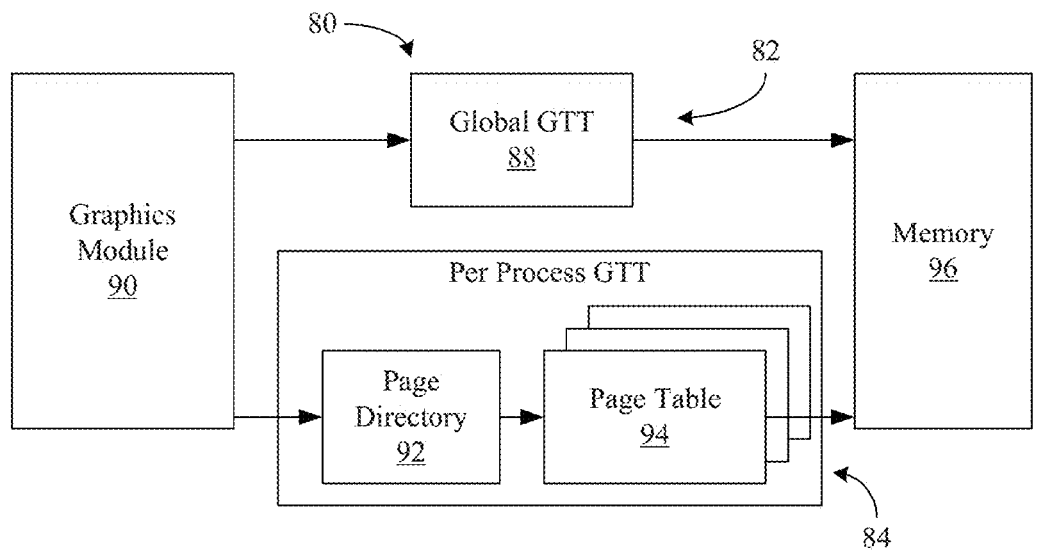
FIGS. 5 and 6 are block diagrams of an example of a per process graphics virtualization approach according to an embodiment.

FIG. 5 shows a per process graphics virtualization environment 80. In this regard, GTT address space partitioning as described herein may co-exist with per process GTT (PPGTT) based full address space switches. In general, a PPGTT address space may be designed for massive rendering workload usage under current process contexts and may be unable or not suitable to be used as a global address space for performance and security reasons. Although other embodiments are considered, the environment 80 may include two primary data paths, such as a render data path and a display data path.

For example, the environment 80 may represent a graphics data path in an advanced scheduler model, wherein, an advanced scheduler may be part of an OS or a graphics VM, such as the VMs 10 (FIG. 1). The illustrated environment 80 includes a display path 82 and a render path 84, wherein a graphics module 90 may use graphics memory addresses to access data. The graphics module 90 may include, for example, rendering engines, media (e.g., audio and video) engines, GPGPU (general purpose GPU) engines, and so forth. The graphics memory addresses may be translated to system memory addresses by a global GTT 88. The graphics module 90 may also use a PPGTT including a page directory 92 and a page table 94 to translate graphics memory addresses to physical addresses, depending on the addressing mode the command uses. Thus, the GTT translated address space, including aperture regions, may be accessed by the GPU as a frame buffer and/or used for other rendering engine purposes. Alternatively, the PPGTT translated address space may also be used as a frame buffer.

Figure 6:
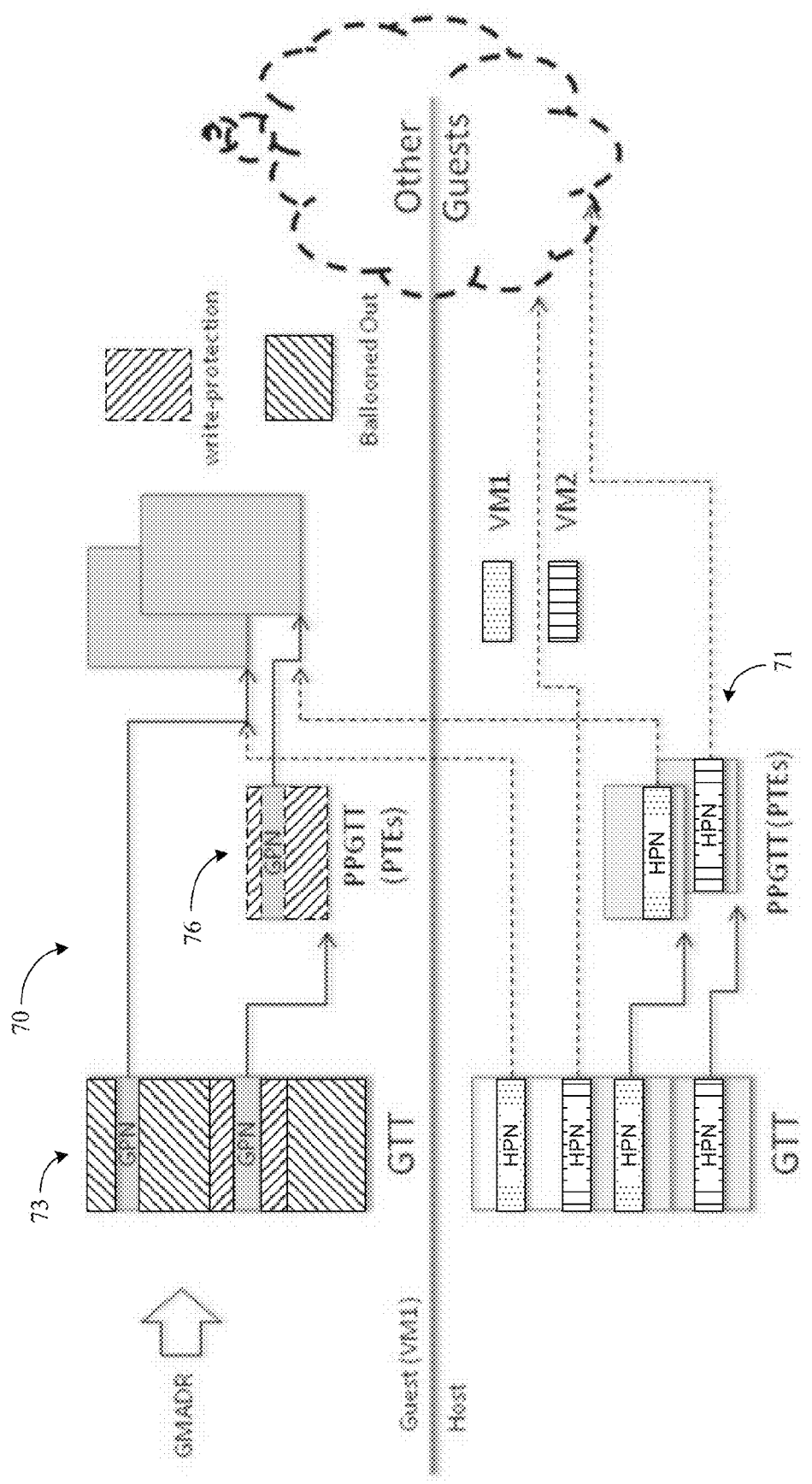

Accordingly, FIG. 6 demonstrates a virtualization approach 70 in which the mapping of the PPGTT may not be required to be present all the time (e.g., when the context is "scheduled out"), or may be dynamically switched between guest PPGTTs. In one example, each PPGTT entry includes a page directory index into a page directory (e.g., page table base, part of the GTT), a page table index into a page table (e.g., page address, part of system memory), and an offset into a page in memory (e.g., final address). In such a case, the page directory index and the page table index may constitute the system address, a guest page number (GPN) from the guest's perspective and a host page number (HPN) from the host's perspective. Thus, the illustrated approach 70 demonstrates that a PPGTT 76 may be identified, a shadow PPGTT 71 may be maintained for page table entries (PTEs), and a partitioned GTT 73 may be maintained for aperture regions and page directory entries (PDEs) of the PPGTT 76.

Figure 7:
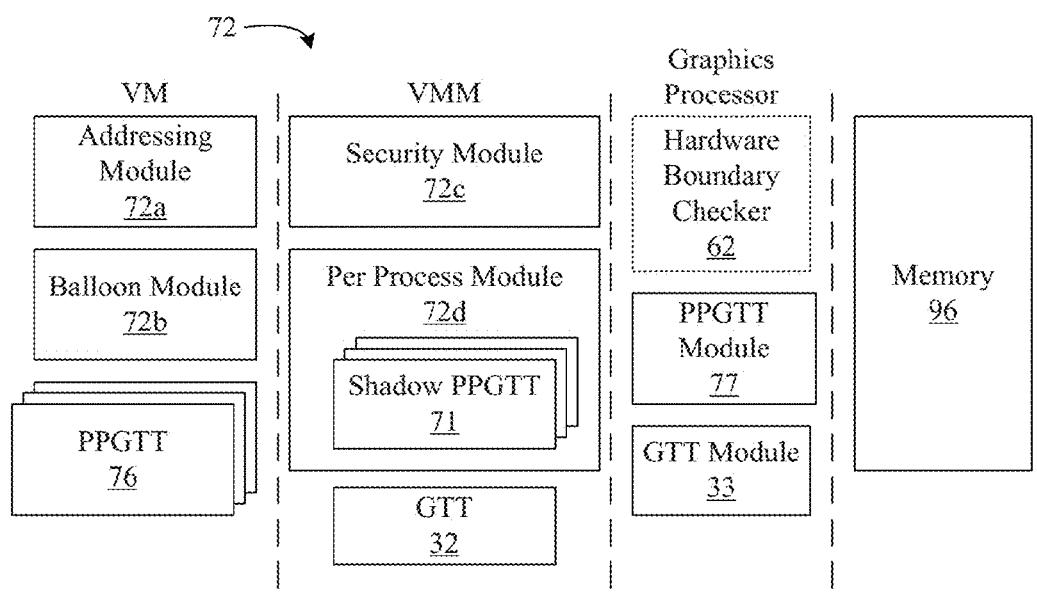
FIG. 7 is a block diagram of an example of a logic architecture according to an embodiment.

Turning now to FIG. 7, a logic architecture 72 (72a-72d) is shown. The logic architecture 72 may generally implement one or more aspects of the method 44 (FIG. 3), and may function as the efficiency logic 22 (FIG. 1), already discussed. Accordingly, an addressing module 72a (e.g., various applications seeking access to graphics memory) may identify an assigned address space of a VM, wherein the assigned address space is to be associated with a graphics memory. The logic architecture 72 may also include a balloon module 72b to balloon a remaining address space that is not assigned to the VM. As already discussed, the view of the graphics memory address space by the VM may be identical to the view of the VMM address space.

In one example, the logic architecture 72 also includes a security module 72c that identifies commands from the VM, uses the VMM to conduct scans of the commands and generates an alert (e.g., host processor/CPU interrupt), and or stops executing the command, if the commands attempt to access the remaining address space that is not assigned to the VM (e.g., the ballooned out address space). Once the scan is complete, the VMM may issue the command to the hardware device for execution.

The VMM portion of the illustrated logic architecture 72 also includes a per process module 72d that identifies a PPGTT 76, maintains a shadow PPGTT 71 for page table entries (PTEs), and maintains a partitioned GTT 32 for aperture regions and page directory entries (PDEs) of the PPGTT 76.

A graphics processor may alternatively use a hardware boundary checker 62 to conduct the scans of the commands, wherein the hardware boundary checker 62 may generate an alert and/or stop executing the command if one or more of the commands attempt to access the remaining address space. Moreover, the scan may verify the commands against multiple aperture segments and multiple non-aperture segments in the assigned address space.

The graphics processor may also include a PPGTT module 77 and a GTT module 33 to support the address translation, wherein the scan by the hardware boundary checker 62 may be conducted subsequent to the address translation.

Figure 8:
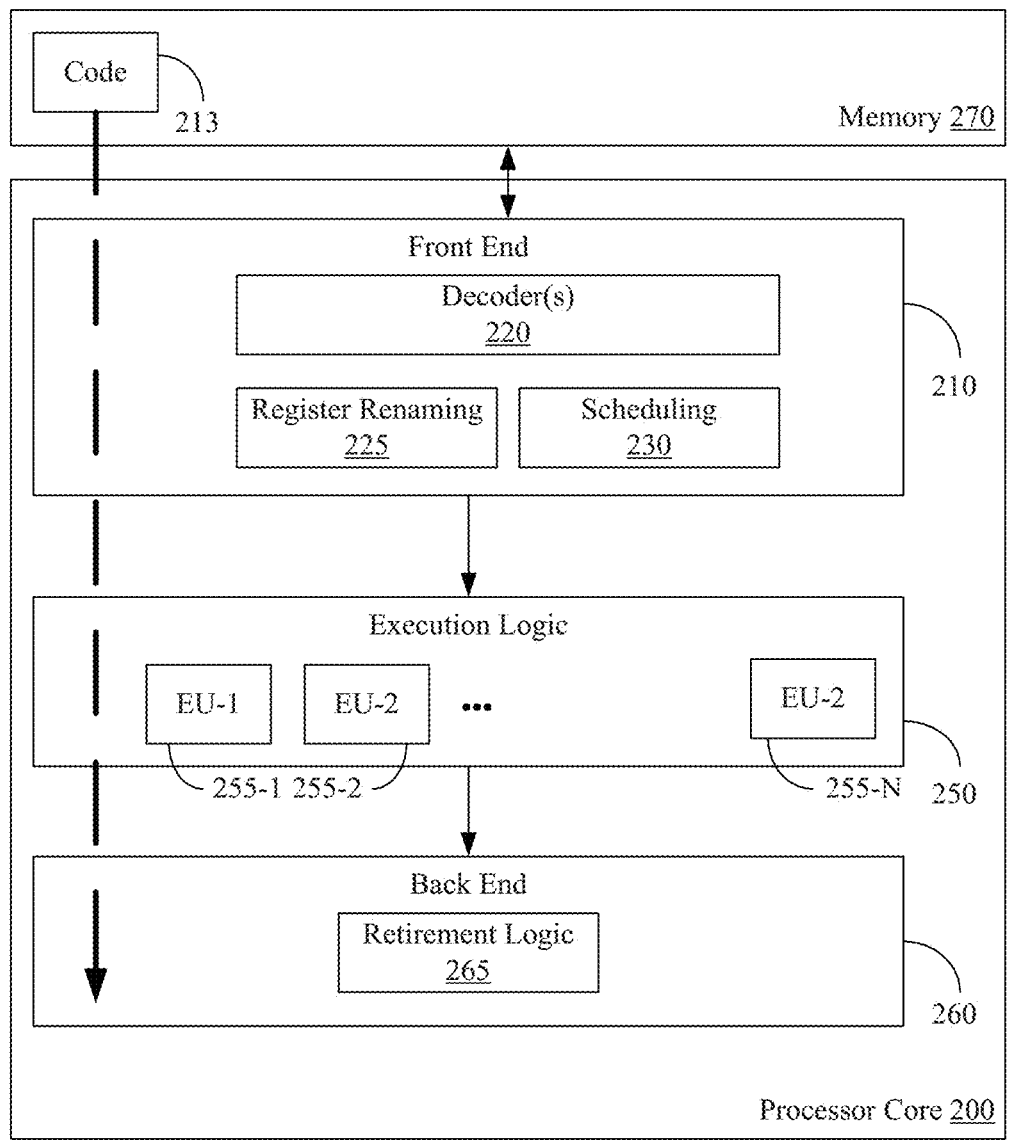
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a GPU, a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement one or more aspects of the method 44 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 9, shown is a block diagram of a system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC and P-P interfaces 1086 and 1088. As shown in FIG. 9, MC's 1072 and 1082 couple the processors to respective memories, namely a memory and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, the graphics engine 1038 includes a GPU and a bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., cameras) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 44 (FIG. 3), and may be similar to the code 213 (FIG. 8), already discussed. Further, an audio I/O 1024 may be coupled to second bus 1020.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 may include an apparatus to manage virtual machines, comprising an addressing module to identify an assigned address space of a virtual machine (VM), wherein the assigned address space is to be associated with a graphics memory address space. The apparatus may also include a balloon module to balloon a remaining address space that is not assigned to the VM, wherein a view of the graphics memory address space by the VM is identical to a virtual machine monitor (VMM) address space.

Example 2 may include the apparatus of Example 1, further including a security module to identify a command from the VM, use the VMM to conduct a scan of the command and generate an alert if the command attempts to access the remaining address space that is not assigned to the VM.

Example 3 may include the apparatus of Example 1, further including a security module to identify a command from one or more of the VM or a graphics module, the security module having a hardware boundary checker to conduct a scan of the command and generate an alert if the command attempts to access the remaining address space.

Example 4 may include the apparatus of Example 3, wherein the scan is to verify the command against multiple aperture segments and multiple non-aperture segments in the assigned address space.

Example 5 may include the apparatus of Example 1, further including a per process module to identify a per process graphics translation table (PPGTT), maintain a shadow PPGTT for page table entries (PTEs), and maintain a partitioned graphics translation table (GTT) for aperture regions and page directory entries (PDEs) of the PPGTT.

Example 6 may include the apparatus of Example 1, further including a graphics translation table (GTT) to map a command address in the assigned address space to a physical address in the graphics memory.

Example 7 may include the apparatus of any one of Examples 1 to 6, wherein the assigned address space is to include an aperture region and a non-aperture region.

Example 8 may include a method of managing virtual machines, comprising identifying an assigned address space of a VM, wherein the assigned address space is associated with a graphics memory address space. The method may also provide for ballooning a remaining address space in the graphics memory that is not assigned to the VM, wherein a view of the graphics memory address space by the VM is identical to a virtual machine monitor (VMM) address space.

Example 9 may include the method of Example 8, further including identifying a command from the VM, and using the VMM to conduct a scan of the command and generate an alert if the command attempts to access the remaining address space that is not assigned to the VM.

Example 10 may include the method of Example 8, further including identifying a command from one or more of the VM or a graphics module, and using a hardware boundary checker to conduct a scan of the command and generate an alert if the command attempts to access the remaining address space.

Example 11 may include the method of Example 10, wherein the scan is to verify the command against multiple aperture segments and multiple non-aperture segments in the assigned address space.

Example 12 may include the method of Example 8, further including identifying a per process graphics translation table (PPGTT), maintaining a shadow PPGTT for page table entries (PTEs), and maintaining a partitioned graphics translation table (GTT) for aperture regions and page directory entries (PDEs) of the PPGTT.

Example 13 may include the method of Example 8, wherein a graphics translation table (GTT) maps the assigned address space to a physical address in the graphics memory.

Example 14 may include the method of any one of Examples 8 to 13, wherein the assigned address space includes an aperture region and a non-aperture region.

Example 15 may include at least one computer readable storage medium comprising a set of instructions which, if executed by a computing device, cause the computing device to identify an assigned address space of a VM, wherein the assigned address space is to be associated with a graphics memory address space. The instructions, if executed, may also cause a computing device to balloon a remaining address space that is not assigned to the VM, wherein a view of the graphics memory address space by the VM is identical to a virtual machine monitor (VMM) address space.

Example 16 may include the at least one computer readable storage medium of Example 15, wherein the instructions, if executed, cause a computing device to identify a command from the VM, and use the VMM to conduct a scan of the command and generate an alert if the command attempts to access the remaining address space that is not assigned to the VM.

Example 17 may include the at least one computer readable storage medium of Example 15, wherein the instructions, if executed, cause a computing device to identify a command from one or more of the VM or a graphics module, and use a hardware boundary checker to conduct a scan of the command and generate an alert if the command attempts to access the remaining address space.

Example 18 may include the at least one computer readable storage medium of Example 17, wherein the scan is to verify the command against multiple aperture segments and multiple non-aperture segments in the assigned address space.

Example 19 may include the at least one computer readable storage medium of Example 15, wherein the instructions, if executed, cause a computing device to identify a per process graphics translation table (PPGTT), maintain a shadow PPGTT for page table entries (PTEs), and maintain a partitioned graphics translation table (GTT) for aperture regions and page directory entries (PDEs) of the PPGTT.

Example 20 may include the at least one computer readable storage medium of Example 15, wherein a graphics translation table (GTT) is to map the assigned address space to a physical address space in the graphics memory.

Example 21 may include the at least one computer readable storage medium of any one of Examples 15 to 20, wherein the assigned address space is to include an aperture region and a non-aperture region.

Example 22 may include an apparatus to manage virtual machines, comprising means for performing the method of any one of Examples 8 to 14.

Techniques described herein may therefore eliminate the complexity associated with hardware based address remapping and/or fixing in graphics virtualization environments. Moreover, performance related challenges associated with software based address remapping and/or fixing may be obviated.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A method of managing virtual machines, comprising:
   identifying an assigned address space of a first virtual machine (VM) of a plurality of VMs, wherein the assigned address space is associated with a graphics memory address space;
   ballooning a remaining address space in the graphics memory that is not assigned to the first VM to prevent the first VM from using the remaining address space and to allow the remaining address space to be available to be used by at least one other VM of the plurality of VMs while the assigned addressed space is available to be used by the first VM, wherein a view of the graphics memory address space by the first VM is identical to a virtual machine monitor (VMM) address space;
   identifying a command from the first VM;
   using the VMM to conduct a scan of the command and generate an alert if the command attempts to access the remaining address space that is not assigned to the first VM;
   identifying a per process graphics translation table (PPGTT);
   maintaining a shadow PPGTT for page table entries (PTEs); and
   maintaining a partitioned graphics translation table (GTT) for aperture regions and page directory entries (PDEs) of the PPGTT.

2. The method of claim 1, further including:
   identifying a command from one or more of the first VM or a graphics module; and
   using a hardware boundary checker to conduct a scan of the command and generate an alert if the command attempts to access the remaining address space.

3. The method of claim 2, wherein the scan is to verify the command against multiple aperture segments and multiple non-aperture segments in the assigned address space.

4. The method of claim 1, wherein a graphics translation table (GTT) maps a command address in the assigned address space to a physical address in the graphics memory.

5. The method of claim 1, wherein the assigned address space includes an aperture region and a non-aperture region.

6. An apparatus to manage virtual machines, comprising:
   an addressing circuit to identify an assigned address space of a first virtual machine (VM) of a plurality of VMs, wherein the assigned address space is to be associated with a graphics memory address space;
   a balloon circuit to balloon a remaining address space that is not assigned to the first VM to prevent the first VM from using the remaining address space and to allow the remaining address space to be available to be used by at least one other VM of the plurality of VMs while the assigned addressed space is available to be used by the first VM, wherein a view of the graphics memory address space by the first VM is to be identical to a virtual machine monitor (VMM) address space;
   a security circuit to identify a command from the first VM, use the VMM to conduct a scan of the command and generate an alert if the command attempts to access the remaining address space that is not assigned to the first VM; and
   a per process circuit to identify a per process graphics translation table (PPGTT), maintain a shadow PPGTT for page table entries (PTEs), and maintain a partitioned graphics translation table (GTT) for aperture regions and page directory entries (PDEs) of the PPGTT.

7. The apparatus of claim 6, further including a security circuit to identify a command from one or more of the first VM or a graphics circuit, the security circuit having a hardware boundary checker to conduct a scan of the command and generate an alert if the command attempts to access the remaining address space.

8. The apparatus of claim 7, wherein the scan is to verify the command against multiple aperture segments and multiple non-aperture segments in the assigned address space.

9. The apparatus of claim 6, further including a graphics translation table (GTT) to map a command address in the assigned address space to a physical address in the graphics memory.

10. The apparatus of claim 6, wherein the assigned address space is to include an aperture region and a non-aperture region.

11. At least one non-transitory computer readable storage medium comprising a set of instructions which, if executed by a computing device, cause the computing device to:
    identify an assigned address space of a first virtual machine (VM) of a plurality of VMs, wherein the assigned address space is to be associated with a graphics memory address space;
    balloon a remaining address space that is not assigned to the first VM to prevent the first VM from using the remaining address space and to allow the remaining address space to be available to be used by at least one other VM of the plurality of VMs while the assigned addressed space is available to be used by the first VM, wherein a view of the graphics memory address space by the first VM is identical to a virtual machine monitor (VMM) address space;
    identify a command from the first VM;
    use the VMM to conduct a scan of the command and generate an alert if the command attempts to access the remaining address space that is not assigned to the first VM;
    identify a per process graphics translation table (PPGTT);
    maintain a shadow PPGTT for page table entries (PTEs); and
    maintain a partitioned graphics translation table (GTT) for aperture regions and page directory entries (PDEs) of the PPGTT.

12. The at least one non-transitory computer readable storage medium of claim 11, wherein the instructions, if executed, cause a computing device to:
    identify a command from one or more of the first VM or a graphics module; and
    use a hardware boundary checker to conduct a scan of the command and generate an alert if the command attempts to access the remaining address space.

13. The at least one non-transitory computer readable storage medium of claim 12, wherein the scan is to verify the command against multiple aperture segments and multiple non-aperture segments in the assigned address space.

14. The at least one non-transitory computer readable storage medium of claim 11, wherein a graphics translation table (GTT) is to map a command address in the assigned address space to a physical address space in the graphics memory.

15. The at least one non-transitory computer readable storage medium of claim 11, wherein the assigned address space is to include an aperture region and a non-aperture region.

* * * * *